United States Patent [19]
Bogdanovic et al.

[11] Patent Number: 5,756,413
[45] Date of Patent: May 26, 1998

[54] PROCESS FOR RECOVERING COBALT CARBONYL CATALYSTS USED IN THE PREPARATION OF N-ACYL-α-AMINO ACID DERIVATES BY AMIDOCARBONYLATION

[75] Inventors: Sandra Bogdanovic, Frankfurt; Holger Geissler, Kelkheim; Klaus Raab, Burgkirchen; Matthias Beller, Ismaning; Hartmut Fischer, Hofheim, all of Germany

[73] Assignee: Hoechst Aktiengesellschaft, Frankfurt, Germany

[21] Appl. No.: 759,462

[22] Filed: Dec. 5, 1996

[30] Foreign Application Priority Data

Dec. 7, 1995 [DE] Germany ............ 195 45 641.6

[51] Int. Cl.$^6$ .......... B01J 38/68; B01J 20/34; B01J 38/64; B01J 38/52
[52] U.S. Cl. .......... 502/24; 502/25; 502/33
[58] Field of Search .......... 502/24, 25, 29, 502/33; 562/406, 517, 518, 519

[56] References Cited

U.S. PATENT DOCUMENTS

| | | | |
|---|---|---|---|
| 4,264,515 | 4/1981 | Stern et al. | 260/404 |
| 4,497,964 | 2/1985 | Ojima et al. | 562/406 |
| 4,699,999 | 10/1987 | El-Chahawi et al. | 562/450 |
| 4,906,764 | 3/1990 | Takamatsu et al. | 558/87 |
| 5,026,900 | 6/1991 | Coste et al. | 502/24 |

FOREIGN PATENT DOCUMENTS

| | | |
|---|---|---|
| 0 343 042 | 11/1989 | European Pat. Off. |
| 0 432 125 | 6/1991 | European Pat. Off. .......... C22B 3/28 |
| 32 42 374 | 5/1983 | Germany. |

OTHER PUBLICATIONS

Patent Abstracts of Japan, vol. 8, no 34, Feb. 15, 1984 & JP-A 58 198441 (Denki Kagaku Kogyo KK), Nov. 18, 1983.

*Primary Examiner*—Glenn Caldarola
*Assistant Examiner*—Alexander G. Ghyka
*Attorney, Agent, or Firm*—Connolly and Hutz

[57] ABSTRACT

The present invention relates to a process for recovering the cobalt carbonyl catalyst used, in which a water-soluble cobalt salt is first prepared by addition of acid and this is subsequently precipitated as cobalt hydroxide. This cobalt hydroxide is then reacted with the N-acyl-α-amino acid derivative for whose preparation the cobalt carbonyl catalyst is intended, and the resulting cobalt-containing melt is converted into the cobalt carbonyl catalyst in the presence of a mixture of carbon monoxide and hydrogen.

19 Claims, No Drawings

PROCESS FOR RECOVERING COBALT CARBONYL CATALYSTS USED IN THE PREPARATION OF N-ACYL-α-AMINO ACID DERIVATES BY AMIDOCARBONYLATION

Amidocarbonylation is the carbonylation of carboxamides in the presence of aldehydes and carbon monoxide or synthesis gas to give N-acyl-α-amino acid derivatives. This reaction is carried out in the presence of cobalt carbonyl compounds as catalysts. By using fatty acid amides as amide component and formaldehyde as aldehyde component, this process provides access to the N-acylsarcosine class of compounds, which are used industrially as surfactants, soaps and emulsifiers.

A significant part of such a preparative process is the design of a catalyst circuit, i.e. a process separating the catalyst used from the product produced, its reprocessing and its return to the preparative process.

For cost reasons and to avoid environmental pollution by cobalt compounds, a recovery process for the cobalt carbonyl catalyst used which is as complete as possible and at the same time simple and inexpensive is therefore wanted.

JP-A-54-112816 discloses a process for preparing dialkyl malonates by esterification of alkylmonohaloacetic acid with a lower aliphatic alcohol and carbon monoxide in the presence of a cobalt carbonyl catalyst and a basic compound. Subsequent to this esterification, the catalyst is decomposed by addition of an aqueous solution of an inorganic acid, e.g. sulfuric acid. From the aqueous phase thus obtained and separated off, the water-soluble cobalt salt is precipitated as water-insoluble cobalt hydroxide by addition of alkali metal hydroxide, e.g. sodium hydroxide. The cobalt hyroxide precipitate is washed thoroughly and the washing water present is removed. Subsequently, the cobalt hydroxide is converted into the appropriate cobalt carbonyl compound by treatment with carbon monoxide or carbon monoxide/ hydrogen in the presence of an organic solvent, e.g. an aromatic hydrocarbon or an alcohol suitable for the esterification. The cobalt carbonyl catalyst obtained in this way is again used for the esterification.

JP-A 57-183749 describes a process for preparing γ-amino-β-hydroxybutanolic acid in which, in an initial carbonylation step, epichlorohydrin, carbon monoxide, a basic compound and an alcohol are reacted to give γ-amino-β-hydroxybutanoic acid. In the subsequent process step the cobalt carbonyl catalyst is decomposed by addition of mineral acid, e.g. sulfuric acid, and oxygen to the reaction solution obtained in the previous process step. Subsequently, the alcohol present in the reaction solution is removed and water is then added to form a two-phase system which is separated into an aqueous phase containing the water-soluble cobalt salt and an organic phase containing γ-amino-β-hydroxybutanoic acid. The cobalt carbonyl catalyst is recovered by addition of alkali metal hydroxide to the aqueous phase. The cobalt hydroxide precipitate formed is filtered off, washed and subsequently dewatered. Subsequent reaction of the cobalt hydroxide with carbon monoxide and hydrogen gives back the cobalt carbonyl catalyst.

JP-A 58-198441 relates to a process for preparing diesters of malonic acid in which, in an initial carbonylation step, monochloroacetic acid, carbon monoxide, sodium carbonate and an alcohol are reacted in the presence of a cobalt carbonyl catalyst dissolved in alcohol or acetone. In the subsequent process step, the cobalt carbonyl catalyst is decomposed by addition of sulfuric acid and oxygen to the reaction solution obtained before. The excess alcohol or acetone is removed by distillation. Water is added to the concentrated reaction solution and the aqueous and organic phases thus obtained are further processed separately, with the diester of malonic acid being obtained from the organic phase by distillation. The aqueous phase containing cobalt sulfate is made alkaline by addition of alkali metal hydroxide and the resulting cobalt hydroxide precipitate is washed, filtered off and the water present is removed, e.g. by spray drying. Subsequently, the dried cobalt hydroxide is converted by reaction with carbon monoxide and hydrogen in alcohol or acetone into the corresponding solution of a cobalt carbonyl catalyst.

EP-A-0 343 042 relates to a process for preparing dialkyl malonates by carbonylation of an alkyl chloroacetate in the presence of a cobalt carbonyl catalyst. The recovery of the cobalt carbonyl catalyst used is carried out in a number of process steps, with a water-soluble cobalt salt first being prepared by addition of acid. In the next process step, this cobalt salt is converted into the salt of a fatty acid, e.g. oleic acid, palmitic acid or stearic acid. Reaction of this fatty acid salt with carbon monoxide and hydrogen gives the desired cobalt carbonyl catalyst.

The abovementioned processes of the prior art are not suitable for recovering cobalt catalysts used in the preparation of N-acyl-α-amino acid derivatives by amidocarbonylation for the reasons given below.

It is an object of the present invention to provide a process for recovering cobalt carbonyl catalysts used in the preparation of N-acyl-α-amino acid derivatives by amidocarbonylation.

In such a process, the following technical difficulties have to be taken into account in the case of N-acyl-α-amino acid derivatives.

The reaction products of the amidocarbonylation, in particular the N-acylsarcosines already mentioned, are not volatile and can therefore not be removed from the reaction solution by distillation. A distillative separation of the cobalt carbonyl catalysts which are volatile in pure form is likewise not possible since these are destroyed on heating the reaction solution, i.e. in the presence of N-acyl-α-amino acid derivatives. Likewise, note has to be taken of the fact that only part of the cobalt carbonyl catalysts used for the amidocarbonylation are still present as active cobalt carbonyl catalysts after the reaction and therefore the process for the recovery has to take into account a number of different cobalt carbonyl compounds.

Owing to the mild reaction conditions, the cobalt carbonyl catalysts cannot, unlike the case of hydroformylation, be prepared from Co(II) salts, e.g. cobalt acetate, cobalt oxide and cobalt hydroxide, during the carbonylation stage of the amidocarbonylation, but have to be prepared in a preceding process step in order to be used in the subsequent carbonylation stage. The present invention provides a process for recovering cobalt carbonyl catalysts used in the preparation of N-acyl-α-amino acid derivatives, in particular N-acylsarcosines, by amidocarbonylation, which comprises the process steps:

addition of aqueous hydrogen peroxide solution or addition of aqueous hydrogen peroxide solution and sulfuric acid to the reaction solution present after the preparation of the N-acyl-α-amino acid derivative, subsequent separation of the aqueous phase containing water-soluble cobalt(II) sulfate from the nonaqueous phase, subsequent removal of excess hydrogen peroxide from the aqueous phase obtained from the previous process step, subsequent addition of alkali metal hydroxide to the aqueous phase of the previous process step.

subsequent removal of the cobalt hydroxide precipitate obtained, washing with water and subsequent preparation of a cobalt-containing melt from the washed cobalt hydroxide and the N-acyl-α-amino acid derivative for whose preparation the cobalt carbonyl catalyst is intended and final conversion of the cobalt-containing melt thus obtained into the cobalt carbonyl catalyst in the presence of a mixture of carbon monoxide and hydrogen, at a temperature of from 70° to 250° C. and a pressure of from 50 to 250 bar.

In the process of the invention, the cobalt carbonyl catalysts used in the amidocarbonylation, in particular $Co_2(CO)_8$ and $HCo(CO)_4$, are to be recovered. The starting point for this process is the reaction solution present after the preparation of the N-acyl-α-amino acid derivative, in particular the N-acylsarcosine. The process of the invention is particularly suitable for reaction solutions which are obtained according to the process described in the European Patent Application No. 95 106 329.6 (EP-A-0 680 948) for preparing N-acyl-α-amino acid derivatives.

In the first process step, aqueous hydrogen peroxide solution is added to this reaction solution. If the amidocarbonylation has been carried out in sulfuric acid solution, the addition of further sulfuric acid, preferably dilute sulfuric acid, to form water-soluble cobalt salts is generally not necessary.

The resulting aqueous phase containing water-soluble cobalt(II) sulfate is separated from the nonaqeous phase. Further addition of water or aqueous sulfuric acid to the nonaqueous phase containing the N-acyl-α-amino acid derivative, if desired in appropriate extraction equipment, e.g. mixer settler boxes, centrifugal extractor and counter-current extraction column, enables the cobalt content of this nonaqueous phase to be further reduced. It has been found that the presence of hydrogen peroxide under precipitation conditions leads to formation of water-containing cobalt(III) hydroxide which is stable in alkaline medium but is obtained as a very fine precipitate which is difficult to filter. Excess hydrogen peroxide is usually removed by heating the aqueous phase, preferably to the boiling point. It is industrially advantageous to heat the aqueous phase under reduced pressure while simultaneously distilling off solvent.

After the excess hydrogen peroxide has been removed, alkali metal hydroxide, preferably sodium and/or potassium hydroxide, is added to the aqueous phase. This addition gives a water-insoluble precipitate of cobalt hydroxide. Preference is given to adding 30% strength by weight aqueous alkali metal hydroxide solution. The pH of the aqueous phase at the end of the addition of the alkali metal hydroxide should preferably be about 12. For the precipitation, it is advantageous for the cobalt sulfate solution to have a concentration not exceeding 2% by weight, since otherwise complete precipitation in the form of cobalt hydroxide is not achieved.

This water-insoluble cobalt hydroxide precipitate is separated from the aqueous phase. In general, the precipitate contains between 8 and 12% by weight of cobalt, about 70% by weight of water (determined by drying in vacuo at 90° C.) and about 10% by weight of sulfate salt. The water-soluble salts are removed by subsequent washing with water without this resulting in a significant loss of cobalt ions with the washing water. For the process of the invention, it is advantageous if the cobalt hydroxide precipitate is very substantially free of salts.

In the next process step, a cobalt-containing melt is prepared from the washed cobalt hydroxide precipitate and the N-acyl-α-amino acid derivative for whose preparation the cobalt carbonyl catalyst is used. In this procedure, the washed cobalt hydroxide is preferably introduced into the melt of the N-acyl-α-amino acid derivative. These derivatives are preferably N-acylsarcosines, particularly fatty acid sarcosines such as oleoyl sarcosine or lauroylsarcosine The cobalt-containing melt is preferably prepared by reacting cobalt hydroxide, preferably having a water content of 65–75% by weight of water, with the N-acyl-α-amino acid derivative in a molar ratio of 1:2–5, preferably 1:3–4. The reaction of the cobalt hydroxide with the N-acyl-α-amino acid derivative usually takes place at from 100° to 120° C. It is possible for cobalt hydroxide lumps which react further only slowly can occur during this reaction. This problem can be remedied by addition of catalytic amounts of acetic acid to the slurried cobalt hydroxide. Reaction of cobalt hydroxide with the N-acyl-α-amino acid derivative produces a cobalt-containing melt which can be completely freed of water under reduced pressure and at elevated temperature without dry cobalt salts being formed.

The conversion of the cobalt-containing melt thus obtained into the cobalt carbonyl catalyst is preferably carried out in a polar aprotic solvent since it can also be used as solvent in the subsequent amidocarbonylation. Solvents which have been found to be particularly suitable are tetrahydrofuran, glycol dimethyl ether, tert-butyl methyl ether, diglycol dimethyl ether, dimethylformamide, dimethylacetamide, butyl acetate and acetonitrile. In particular, tetrahydrofuran, tert-butyl methyl ether and glycol dimethyl ether are used. For the purposes of this conversion, the cobalt-containing melt is reacted with carbon monoxide or a mixture of carbon monoxide and hydrogen, known as synthesis gas, at a temperature of from 70° to 250° C. and a pressure of from 50 to 250 bar, preferably from 60 to 200 bar, particularly preferably from 80 to 180 bar. The composition of the carbon monoxide/hydrogen mixture is preferably from 4:1 to 1:4. The cobalt carbonyl catalyst formed can be used for the amidocarbonylation without restriction.

PREPARATION EXAMPLE

Recovery of cobalt carbonyl catalyst used in the preparation of lauroylsarcosine by amidocarbonylation.

100 ml of a cobalt sulfate solution which is obtained by separation from the organic phase and contains sulfuric acid, remaining amounts of hydrogen peroxide and 1.56% by weight of Co is first freed of hydrogen peroxide by heating to the boiling point.

After this sulfuric acid solution has cooled, the pH is adjusted to 12 by addition of 12 ml of 30% strength by weight sodium hydroxide solution, with cobalt hydroxide being obtained in the form of a blue-green precipitate (20.0 g) containing a large amount of water.

The precipitate is filtered off with suction through a G3 filter frit and washed substantially free of sulfate using 200 ml of water. The cobalt hydroxide (18.2 g), which contains a large amount of water, is slurried in 29.0 g of lauroylsarcosine (about 4 mol equivalents) and the viscous suspension is heated to 120° C. while stirring. The cobalt hydroxide dissolves to form a violet solution.

After the cobalt hydroxide precipitate has completely dissolved, the cobalt-containing melt is freed of the water present on a rotary evaporator (water bath temperature: 95° C., pressure: 50 mbar). The residue (29.7 g) is subsequently dissolved in 30 ml of methyl-t-butyl ether and carbonylated with synthesis gas (ratio of CO: $H_2$=2:1) at a pressure of 120 bar in a steel autoclave. The reaction starts at between 70° and 90° C. The cobalt carbonyl formed can be used without restriction for the amidocarbonylation to give lauroylsarcosine.

We claim:

1. A process for recovering cobalt carbonyl catalysts used in the preparation of N-acyl-α-amino acid derivatives, in particular N-acylsarcosines, by amidocarbonylation, which comprises the process steps:

- addition of aqueous hydrogen peroxide solution or addition of aqueous hydrogen peroxide solution and sulfuric acid to the reaction solution present after the preparation of the N-acyl-α-amino acid derivative,
- subsequent separation of the aqueous phase containing water-soluble cobalt(II) sulfate from the nonaqueous phase,
- subsequent removal of excess hydrogen peroxide from the aqueous phase obtained from the previous process step,
- subsequent addition of alkali metal hydroxide to the aqueous phase of the previous process step,
- subsequent removal of the cobalt hydroxide precipitate obtained, washing with water and
- subsequent preparation of a cobalt-containing melt from the washed cobalt hydroxide precipitate and the N-acyl-α-amino acid derivative for whose preparation the cobalt carbonyl catalyst is intended and
- final conversion of the cobalt-containing melt thus obtained into the cobalt carbonyl catalyst in the presence of a mixture of carbon monoxide and hydrogen, at a temperature of from 70° to 250° C. and a pressure of from 50 to 250 bar.

2. The process as claimed in claim 1, wherein the excess hydrogen peroxide is removed by heating the aqueous phase.

3. The process as claimed in claim 1, wherein sodium hydroxide or potassium hydroxide or a mixture thereof is added to the aqueous phase.

4. The process as claimed in claim 1, wherein 30% strength by weight aqueous alkali metal hydroxide solution is added to the aqueous phase.

5. The process as claimed in claim 1, wherein the pH of the aqueous phase at the end of the addition of the alkali metal hydroxide is about 12.

6. The process as claimed in claim 1, wherein the cobalt-containing melt is prepared by introducing the washed cobalt hydroxide into the melt of an N-acyl-α-amino acid derivative.

7. The process as claimed in claim 1, wherein the washed cobalt hydroxide has a water content of 65–75% by weight of water.

8. The process as claimed in claim 1, wherein the N-acyl-α-amino acid derivative is an N-acylsarcosine.

9. The process as claimed in claim 1, wherein, in the preparation of the cobalt-containing melt, the molar ratio between cobalt hydroxide and N-acyl-α-amino acid derivative is 1:2–5.

10. The process as claimed in claim 1, wherein the cobalt-containing melt is freed of the water present before conversion into the cobalt carbonyl catalyst.

11. The process as claimed in claim 1, wherein the conversion of the cobalt-containing melt into the cobalt carbonyl catalyst is carried out in a polar aprotic solvent.

12. The process as claimed in claim 1, wherein the conversion of the cobalt-containing melt into the cobalt carbonyl catalyst is carried out at a pressure of from 60 to 200 bar.

13. The process as claimed in claim 1, wherein the composition of the carbon monoxide/hydrogen mixture used for converting the cobalt-containing melt into the cobalt carbonyl catalysts is from 4:1 to 1:4.

14. The process as claimed in claim 2, wherein the excess hydrogen peroxide is removed by heating the aqueous phase to the boiling point.

15. The process as claimed claim 8, wherein the N-acyl-α-amino acid derivative is a fatty acid sarcosine.

16. The process as claimed in claim 9, wherein, in the preparation of the cobalt-containing melt, the molar ratio between cobalt hydroxide and N-acyl-α-amino acid derivative is 1:3–4.

17. The process as claimed in claim 12, wherein the conversion of the cobalt-containing melt into the cobalt carbonyl catalyst is carried out at a pressures of from 80 to 180 bar.

18. The process as claimed in claim 13, wherein the conversion of the cobalt-containing melt into the cobalt carbonyl catalyst is carried out at a pressure of from 80 to 180 bar and the washed cobalt hydroxide has a water content of 65–75% by weight of water.

19. The process as claimed in claim 18, wherein the conversion of the cobalt-containing melt into the cobalt carbonyl catalyst is carried out in a polar aprotic solvent and the N-acyl-α-amino acid derivative is a fatty acid sarcosine.

* * * * *